July 21, 1959  R. LEDUC  2,895,692
APPARATUS FOR CONTROLLING THE SPEED OF JET AIRCRAFT
Filed Dec. 31, 1953  2 Sheets-Sheet 1

INVENTOR.
RENE LEDUC
BY Michael S. Striker
Attorney

July 21, 1959 R. LEDUC 2,895,692
APPARATUS FOR CONTROLLING THE SPEED OF JET AIRCRAFT
Filed Dec. 31, 1953 2 Sheets-Sheet 2

INVENTOR.
RENE LEDUC
BY Michael J. Striker
Attorney

United States Patent Office

2,895,692
Patented July 21, 1959

2,895,692

APPARATUS FOR CONTROLLING THE SPEED OF JET AIRCRAFT

René Leduc, Le Vesinet, Seine-et-Oise, France

Application December 31, 1953, Serial No. 401,490

Claims priority, application France December 12, 1947

6 Claims. (Cl. 244—76)

The present invention relates to airplanes and in particular to airplanes which have a thrust-producing power plant for propelling the aircraft. More especially, the present invention relates to an apparatus for maintaining the speed of such an aircraft at a desired Mach number.

The present application is a continuation-in-part of my co-pending and now abandoned U.S. patent application, Serial Number 64,614, filed December 10, 1948, and entitled, Automatic Control Devices for Aircraft Power Plants.

One of the objects of the present invention is to provide a means for maintaining the speed of the aircraft at a given Mach number.

A further object of the present invention is to provide a means for adjusting the Mach number at which the speed of the aircraft is maintained.

Another object of the present invention is to provide a means for preventing the temperature of the power plant from exceeding a predetermined value.

An additional object of the present invention is to provide a dynamically balanced means for maintaining the speed of the aircraft at a given Mach number.

Yet another object of the present invention is to provide a pressure-sensitive means, for registering changes in pressure, with a structure for counter-balancing the resiliency inherent in the material of the pressure-sensitive means so that the latter will accurately register even very small changes in pressure.

With the above objects in view the present invention mainly consists of an aircraft having a thrust-producing power plant for propelling the aircraft, this aircraft further including a regulating means for regulating the rate at which fuel is supplied to the power plant, so as to regulate the speed of the aircraft. A control means is operatively connected to this regulating means for operating the latter to supply fuel to the power plant at a rate which maintains a substantially constant ratio between the total and static pressures of the atmosphere in which the aircraft is located, so that the speed of the aircraft will be maintained at a given Mach number. An adjusting means is connected to the control means for adjusting this ratio so as to adjust the speed of the aircraft, and limiting means is operatively connected to the regulating means for limiting the rate of fuel supply to the power plant so as to maintain the temperature of the power plant beneath a predetermined value.

Also, with the above objects in view, the present invention mainly consists of a device for registering changes in pressure and including a bellows made of a resilient material having a predetermined inherent resiliency and a compressing means connected to the bellows for compressing the latter with a force which counterbalances the force inherent in the resilient material of the bellows so that the material of the bellows does not affect the manner in which pressure changes are registered.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
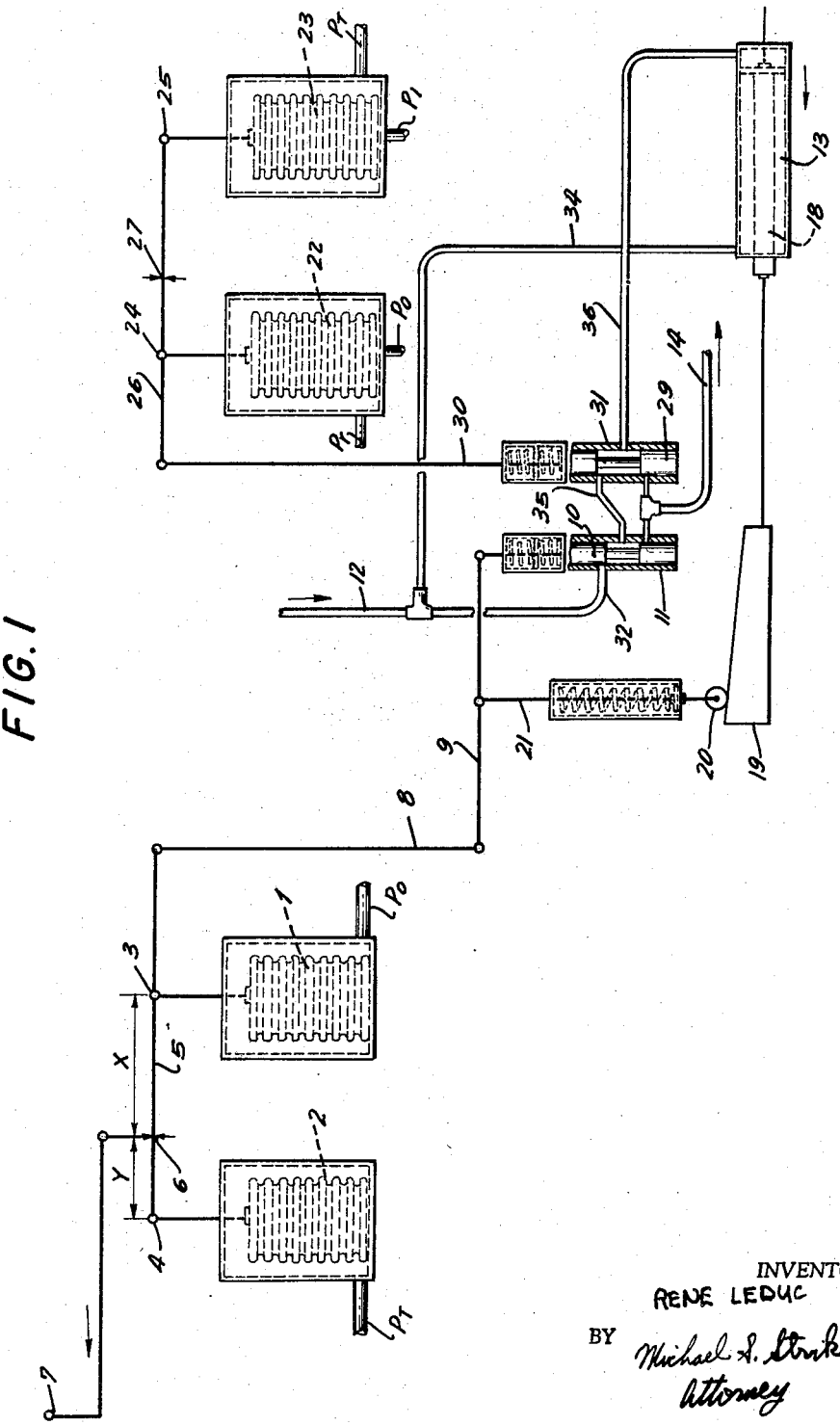
Fig. 1 is a schematic illustration of the structure of the invention.

Before proceeding to a description of the structure illustrated in the drawings, it is pointed out that the present invention is based on the proven principle that if the ratio between the total and static pressures of the atmosphere in which an aircraft is moving is maintained constant then the Mach number will also remain constant.

Referring to Fig. 1 of the drawings, it will be seen that the invention includes a pair of aneroid capsules 1 and 2 which are mounted in the aircraft, the aneroid capsule 1 being in the form of a known pressure-sensitive device for registering changes in the static pressure of the atmosphere in which the aircraft is located, and the aneroid capsule 2 being in the form of a known pressure-sensitive device for registering changes in the total (static plus dynamic) pressure of the atmosphere in which the aircraft is located.

The pressure-sensitive device 1 is provided with a rod linked at 3 to the lever 5, this rod moving when the static pressure changes, and the pressure-sensitive device 2 is provided with a rod linked at 4 to the lever 5, the rod of pressure-sensitive device 2 moving when the total pressure changes. The lever 5 is provided with an adjustable fulcrum 6 which may be shifted by the pilot upon operation of the linkage 7 connected to the fulcrum 6, this linkage 7 being the speed control device of the aircraft. Thus, depending upon the location of the fulcrum 6, the pressure-sensitive device 1 will act through a moment arm $x$ and the pressure-sensitive device 2 will act through a moment arm $y$. It is believed to be apparent that when the product of moment arm $x$ and the force of pressure-sensitive device 1 equals the product of the force of pressure-sensitive device 2 and the moment arm $y$, a position of equilibrium is reached where the ratio between the total and static pressures is maintained constant until the position of equlibrium is disturbed.

The lever 5 is connected through a transmission means made up, for example, of the links 8 and 9 to a valve means 10, 11. This valve means includes a stationary cylinder 11 in which the slide valve member 10 is slidable, this slide valve member 10 being provided intermediate its ends with an annular cutout.

A conduit means 12 is provided to supply a fluid under pressure for actuating a servomotor 13, 18 which is connected, in a manner not illustrated and forming no part of the present invention, to a fuel supply valve for regulating the rate at which fuel is supplied to the power plant of the aircraft. This servomotor includes a cylinder 13 in which the piston 18 is slidable, a rod extending from the right-hand end of the piston 18 through the right end wall of cylinder 13, as viewed in Fig. 1, to a linkage or the like which operates the fuel supply valve. The conduit means 12 includes a conduit portion 32 communicating with the interior of cylinder 11 and a conduit portion 34 communicating with the left end of cylinder 13 so that when fluid moves through conduit portion 34 into the cylinder 13, the piston 18 moves to the right, as viewed in Fig. 1. As is apparent from Fig.

1, a pair of conduits 14 and 35 are also connected to the cylinder 11, and the length of the annular cutout of slide valve member 10 is such that in the position shown in Fig. 1 conduit 32 is cut off from conduits 35 and 14, while when member 10 moves upwardly, as viewed in Fig. 1, conduit 32 is placed in communication with conduit 35, whereas when valve member 10 moves downwardly, conduit 32 remains cut off from conduits 35 and 14 and these latter two conduits are placed in communication with each other. Conduit 14 leads to a tank or the like into which the fluid is discharged, and a pump or the like (not shown) is connected to this tank and the conduit means 12 for supplying fluid under pressure to the portions 32 and 34 of conduit means 12.

The left end of piston 18, as viewed in Fig. 1, is connected through a rigid rod or the like, to a substantially wedge-shaped member 19 guided by any suitable structure for reciprocating horizontal movement, as viewed in Fig. 1, and it will be seen from Fig. 1 that upper face of member 19 is inclined downwardly to the right. A roller 20 engages the top face of member 19 and is turnably connected to the bottom end of a rod 21 which is in turn pivotally connected at its top end to the link 9. As is shown in Fig. 1, a guide means is provided to limit rod 21 to vertical movement, as viewed in Fig. 1, and this guide means may take the form of a stationary tube having an apertured end wall through which rod 21 freely extends and housing a coil spring which bears on a plate fixed to rod 21 for urging the latter downwardly, as viewed in Fig. 1, so as to maintain roller 20 in engagement with the top face of member 19.

The conduits 35 and 14 communicate with the interior of a cylinder 31 of a second valve means 29, 31 which includes a slide valve member 29 slidable in the cylinder 31 and also provided with an annular cutout of predetermined length. A conduit 36 extends from cylinder 31 to the right-hand end of cylinder 13, as viewed in Fig. 1, so that when fluid under pressure moves through conduit 36 into the cylinder 13, the piston 18 will be moved to the left, as viewed in Fig. 1. The length of the annular cutout of valve member 29 is such that in the position shown in Fig. 1 conduit 35 communicates with conduit 36, while when this valve member 29 moves downwardly, as viewed in Fig. 1, conduit 35 is cut off from conduit 36 and conduit 36 communicates with the discharge conduit 14.

A link 30, forming a transmission means for transmitting movement from a lever 26 to the slide valve member 29, is connected at its bottom end, as viewed in Fig. 1, to the slide valve member 29, and at its top end to the lever 26. A pair of pressure-sensitive devices 22 and 23, for registering pressure changes, are located adjacent to the lever 26. These pressure-sensitive devices each have a rod connected to the expandable and contractable bellows thereof, the rod of pressure-sensitive device 22 being linked to lever 26 at 24, and the rod of pressure-sensitive device 23 being linked to lever 26 at 25. The lever 26 is mounted for turning movement about a fixed fulcrum 27 whose location is carefully chosen for a purpose described below.

As is indicated in Fig. 1, the pressure-sensitive device 22 registers the difference between the total and static pressures of the atmosphere in which the aircraft is located, and the pressure-sensitive device 23 registers the difference between the total pressure $P_T$ and the pressure $P_1$, which is the static pressure of the atmosphere in the power plant at the entrance end of the duct thereof. The location of fulcrum 27 with respect to the points of articulation 24 and 25 are chosen in such a way that the parts of lever 26 respectively located between points 27 and 25, on the one hand, and points 27 and 24, on the other hand, have a ratio corresponding to the ratio of the difference between the total and static pressures to the difference between the total pressure and the pressure $P_1$ which corresponds to the maximum temperature to which the power plant can be heated without undesirably injuring the power plant.

The above described structure of Fig. 1 operates in the following manner:

The fluid under pressure flowing along the conduit means 12 supplies the valve means 10, 11 with fluid under pressure through the conduit 32, and this fluid under pressure also flows to the rear face of piston 18 through the conduit 34. The valve means 10, 11 is controlled by the aneroid capsules 1 and 2 which maintain the speed of the aircraft at a given Mach number. The valve means 29, 31 is controlled by the aneroid capsules 22 and 23 which limit the extent to which the power plant is heated. The conduit 36 supplies fluid under pressure to the front face of piston 18, and the conduit 14 is a low pressure line discharging fluid to a tank, in the manner described above.

Assuming that the parts are in the position shown in Fig. 1, then the aircraft will continue to fly at a constant speed, since, as was pointed out above, if the ratio between the total and static air pressures is maintained constant, the Mach number will also be constant. If, for example, the total pressure should happen to increase or the static pressure should happen to decrease while the aircraft is in flight, then the lever 5 will turn in a counterclockwise direction about the fulcrum 6, raising the link 8 and turning the link 9 in a clockwise direction about the top end of rod 21 so as to move the slide valve member 10 downwardly to place conduits 35 and 14 in communication with each other. In this way fluid under pressure will discharge from the right-hand end of cylinder 13 through the conduit 36, valve means 29, 31, conduit 35, valve means 10, 11, and conduit 14 to the tank, and fluid will flow into cylinder 13 through conduit 34 to move cylinder 13 to the right so as to actuate the fuel supply valve for automatically causing the aircraft to fly in such a way that the total pressure decreases and/or the static pressure increases. It will be seen that as piston 18 moves to the right, under these circumstances, the member 19 also moves to the right and raises the rod 21 to thereby raise the slide valve 10 which cuts off communication between conduits 35 and 14, and this will take place upon again reaching the equilibrium position where the ratio between the total and static pressures is that which is determined by the location of fulcrum 6, that is, the equilibrium position where the product of the total pressure times arm $y$ equals the product of the static pressure times arm $x$.

On the other hand, if the total pressure should tend to decrease or if the static pressure should tend to increase, then the lever 5 will turn about fulcrum 6 in a clockwise direction causing the lever 9 to turn in a counterclockwise direction about the top end of rod 21 so as to raise the slide valve member 10 to place conduit 32 into communication with conduit 35 so that fluid under pressure flows through these conduits, and through valve means 29, 31 and conduit 36 to the head end of piston 18, while the fluid under pressure discharges through conduit 34, the effective area of the piston being greater at its head end than at its rear face, so that the piston 18 moves to the left, as viewed in Fig. 1, to provide the reverse of the above-described operations, which automatically causes the aircraft to change its conditions of flight to one which increases the total pressure and/or decreases the static pressure until the equilibrium position is again reached, the member 19 moving to the left during this operation to cause the rod 21 to move downwardly for lowering the slide valve member 10 so as to cut off communication between conduits 32 and 35 upon again reaching the equilibrium position. Thus, the apparatus of Fig. 1 is capable of automatically maintaining the flight of an aircraft at a speed of a given Mach number.

Assuming now that the pilot wishes to change the speed, so as to accelerate the speed of the aircraft, for example, then the pilot actuates the control 7 so as to move the fulcrum 6 to the left, as viewed in Fig. 1, so as to decrease the length of arm y and increase the length of arm x. The result will be that the moment arm through which the static pressure of pressure-sensitive device 1 acts is increased while the moment arm through which the total pressure of pressure-sensitive device 2 acts is decreased, and thus the lever 5 turns in a clockwise direction about fulcrum 6 to place conduits 32 and 35 in communication with each other, and the same operations take place as those described above in connection with a decrease of total pressure and/or an increase of static pressure, so that the piston 18 automatically actuates the fluid supply valve to increase the supply of fuel to the power plant, the only difference being that with the operations described above the apparatus operates to maintain the aircraft at a pre-set speed while when the fulcrum 6 is shifted the apparatus operates to change the speed of the aircraft, and the parts 1—5 assume a new equilibrium position. The reverse of the above operations take place when the pilot shifts the fulcrum 6 to the right, as viewed in Fig. 1, for decreasing the Mach number.

It is evident from the above discussion that movements of piston 18 to the left, as viewed in Fig. 1, increases the supply of fuel to the power plant, and therefore, the temperature in the duct of the power plant increases so as to increase the pressure $P_1$, which is the static pressure at the entrance end of the duct. Thus, this latter static pressure increases with respect to the ambient static pressure. The location of fulcrum 27 is such that when this static pressure of the power plant increases with respect to the ambient static pressure by an amount corresponding to the maximum temperature at which the power plant is designed to operate, the lever 26 turns in a counterclockwise direction about fulcrum 27 so as to lower the slide valve member 29, as viewed in Fig. 1, and in this way conduit 35 is cut off from conduit 36 so that the piston 18 cannot continue to move to the left, as viewed in Fig. 1, and therefore the rate fuel supply cannot be increased. Furthermore, this movement of slide valve member 29 places conduit 36 in communication with discharge conduit 14 so as to cause the fluid under pressure to discharge through conduit 36, which causes piston 18 to move to the right, and in this way the rate of fuel supply is positively reduced so that it is impossible with the apparatus of the invention to operate the power plant at too high a temperature. Thus, irrespective of manipulations of control 7 by the pilot, the maximum temperature for which the power plant is designed to operate will never be exceeded.

It should be noted that the above-described structure is highly sensitive and accurately maintains the parts in an equilibrium position corresponding to the Mach number set by the pilot. Furthermore, the structure for limiting the maximum temperature of the power plant is fully operative irrespective of the structure which moves the slide valve member 10.

The simplified system which is diagrammatically and schematically illustrated in Fig. 1 does not allow dynamic balance of all movable bodies to be obtained at all positions of fulcrum 6, and such dynamic balance is of great importance because otherwise acceleration of the aircraft may produce undesired movement of the control levers.

Figure 2:
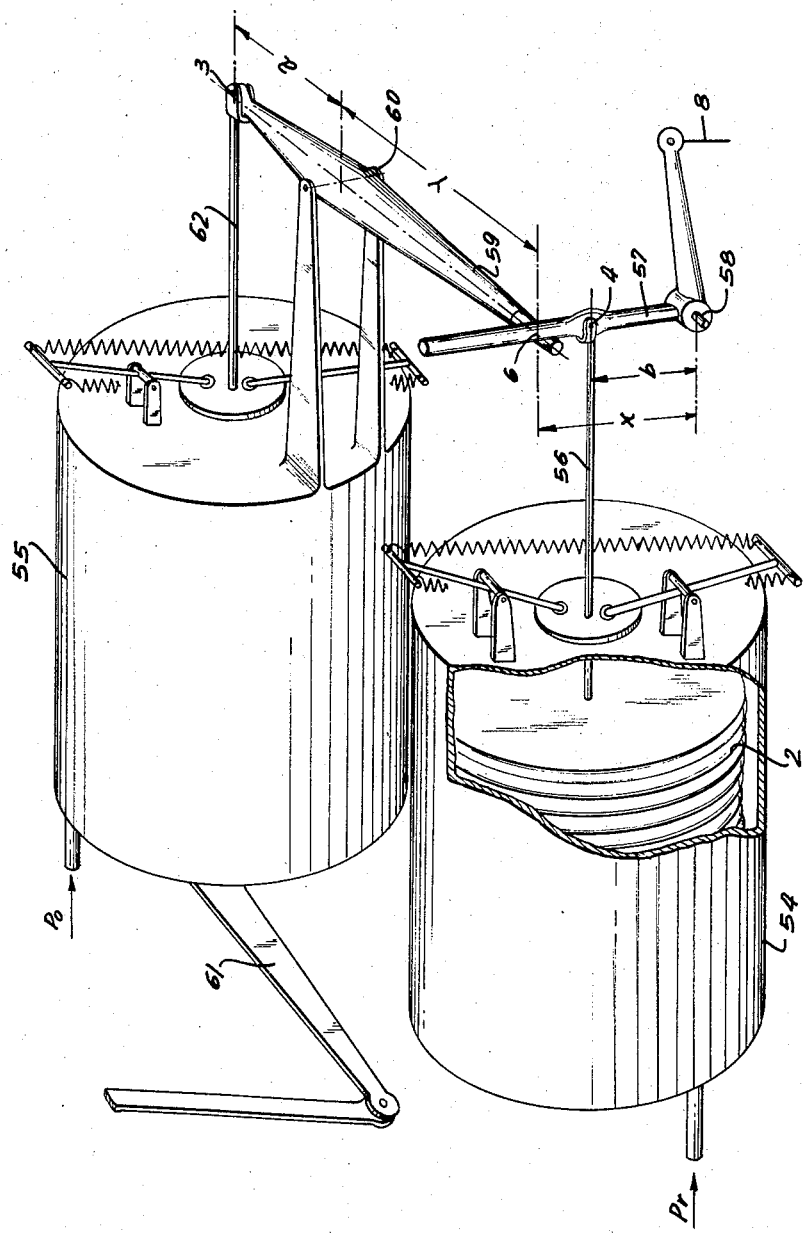
Fig. 2 is a partly sectional and partly diagrammatic perspective view of a practical dynamically balanced apparatus for maintaining a substantially constant ratio between the total and static pressures of the atmosphere in which the aircraft is located.

An arrangement which overcomes this drawback is illustrated in Fig. 2. The casing 54 of the pressure-sensitive device 2, which registers the total pressure, is fixed. Through the medium of the rod 56 the pressure-sensitive device 2 actuates the lever 57 which is mounted for turning movement about the stationary axis 58, rod 56 being linked at 4 to an arm of lever 57 and the transmission means 8 being shown at the lower right hand part of Fig. 3 connected to this lever 57. The pressure within the pressure-sensitive device 2 maintains the lever 57 in engagement with the lever 59 which is pivotally carried at 60 by the casing 55 of the pressure-sensitive device 1 which registers the ambient static pressure of the aircraft.

The rod 62 of the pressure-sensitive device 1 is linked at 3 to the lever 59, and the casing 55 is mounted for rotation about its axis through any suitable support means (not shown). For example, the casing 55 may have its cylindrical side face surrounded by and fixed to a ring which turns with a substantial amount of friction in a stationary ring so that the casing 55 may be turned about its axis and at the same time will remain in the position to which it is turned. An arm 61 is fixed to and extends from casing 55 and is connected through a suitable transmission to the control 7 so that arm 61 may be moved to turn the casing 55 about its axis. Thus, where S is the effective section of each capsule,
a is the constant length of the arm 3—60,
y is the very slightly variable length of the arm 60—6,
x is the variable length of the arm 6—58,
b is the constant length of arm 4—58,
$p_O$ is the static pressure, and
$p_T$ is the total pressure, it will be seen that the balance or forces at point 6 is shown by the equation $$p_o \times S \times \frac{a}{y} = p_T \times S \times \frac{b}{x}$$

or $$\frac{p_o}{p_T} = \frac{b}{x} \times \frac{y}{a} = \frac{b}{a} \times \frac{y}{x} = C \times \frac{y}{x}$$

where C is a constant.

Thus, the structure of Fig. 2 is of course equivalent to the system schematically illustrated in Fig. 1, and since the elements associated with each capsule are completely independent of each other in that no element associated with one capsule is positively connected to an element associated with the other capsule, a dynamically balanced system is provided.

While the invention has been illustrated and described as embodied in means for controlling the speed of aircraft having thrust-producing power plants, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in an aircraft having a thrust-producing power plant for propelling the aircraft, in combination, first pressure-sensitive means for registering changes in total pressure of the atmosphere; second pressure-sensitive means for registering changes in the static pressure of the atmosphere; lever means operatively connected to said first and second pressure-sensitive means for applying the force of said first pressure-sensitive means through a first moment arm against said second pressure-sensitive means through a second moment arm, so that an equilibrium position is reached when the product of said first moment arm times the force of said first pressure-sensitive means equals the product of said second moment arm times the force of said second pressure-sensitive means; regulating means adapted to be connected to a fuel supply valve for regulating the latter to control the rate at which fuel is supplied to the power plant of the aircraft; and transmission means connected to said lever means and regulating means for transmitting movements of said lever means to said regulating means for operating the latter to maintain said equilibrium position of said lever means and first and second pressure-sensitive means.

2. For use in an aircraft having a thrust-producing power plant for propelling the aircraft, in combination, first pressure-sensitive means for registering changes in total pressure of the atmosphere; second pressure-sensitive means for registering changes in the static pressure of the atmosphere; lever means operatively connected to said first and second pressure-sensitive means for applying the force of said first pressure-sensitive means through a first moment arm against said second pressure-sensitive means through a second moment arm, so that an equilibrium position is reached when the product of said first moment arm times the force of said first pressure-sensitive means equals the product of said second moment arm times the force of said second pressure-sensitive means; regulating means adapted to be connected to a fuel supply valve for regulating the latter to control the rate at which fuel is supplied to the power plant of the aircraft; transmission means connected to said lever means and regulating means for transmitting movements of said lever means to said regulating means for operating the latter to maintain said equilibrium position of said lever means and first and second pressure-sensitive means; and adjusting means operatively connected to said lever means for adjusting the length of at least one of said moment arms.

3. For use in an aircraft having a thrust-producing power plant for propelling the aircraft, in combination, first pressure-sensitive means for registering changes in total pressure of the atmosphere; second pressure-sensitive means for registering changes in the static pressure of the atmosphere; lever means operatively connected to said first and second pressure-sensitive means for applying the force of said first pressure-sensitive means through a first moment arm against said second pressure-sensitive means through a second moment arm, so that an equilibrium position is reached when the product of said first moment arm times the force of said first pressure-sensitive means equals the product of said second moment arm times the force of said second pressure-sensitive means; regulating means adapted to be connected to a fuel supply valve for regulating the latter to control the rate at which fuel is supplied to the power plant of the aircraft; transmission means connected to said lever means and regulating means for transmitting movements of said lever means to said regulating means for operating the latter to maintain said equilibrium position of said lever means and first and second pressure-sensitive means; adjusting means operatively connected to said lever means for adjusting the length of at least one of said moment arms; third pressure-sensitive means for registering the difference between the total and static pressures of the atmosphere; fourth pressure-sensitive means for registering the difference between said total pressure and the static pressure at the entrance to the power plant; second lever means operatively connected to said third and fourth pressure-sensitive means for applying the force of said third pressure-sensitive means through a third moment arm against the force of said fourth pressure-sensitive means through a fourth moment arm; interrupting means forming part of said transmission means and being movable between an interrupting position and a non-interrupting position for interrupting transmission of movements of said first-mentioned lever means to said regulating means when said interrupting means is in said interrupting position thereof; and moving means operatively connected to said second lever means and interrupting means for moving the latter to said interrupting position thereof when the product of the force of said third pressure-sensitive means times said third moment arm exceeds the product of the force of said fourth pressure-sensitive means times said fourth moment arm.

4. For use in an aircraft having a thrust-producing power plant for propelling the aircraft, in combination, regulating means adapted to be connected to a fuel supply valve for regulating the latter to control the rate at which fuel is supplied to the power plant; first pressure-sensitive means for registering the difference between the total and static pressures of the atmosphere surrounding the aircraft; second pressure-sensitive means for registering the difference between said total pressure and the static pressure at the entrance to the power plant; lever means operatively connected to said first and second pressure-sensitive means for applying the force of said first pressure-sensitive means through a first moment arm against the force of said second pressure-sensitive means through a second moment arm; actuating means connected to said regulating means for actuating the latter to regulate the fuel supply valve to decrease the rate of fuel supply to the power plant; and transmission means interconnecting said lever means with said actuating means for setting the latter into operation when the product of said first moment arm times the force of said first pressure-sensitive means exceeds the product of said second moment arm times the force of said second pressure-sensitive means.

5. In a structure as defined in claim 2, said lever means comprising a pair of levers respectively connected to said first and second pressure-sensitive means and being urged into engagement with each other by said first and second pressure-sensitive means, and said adjusting means including a control operatively connected to one of said pressure-sensitive means for turning the latter with respect to the other of said pressure-sensitive means so that the lever connected to said one pressure-sensitive means moves with respect to the other of said levers to change said one moment arm.

6. For use in an aircraft having a thrust-producing power plant for propelling the aircraft, in combination, first, second and third conduits for carrying a fluid under pressure; a fourth conduit for discharging fluid to a tank or the like; first valve means interconnecting said first conduit with said second and fourth conduits and having a first position where said first conduit communicates with said second conduit and is cut off from said fourth conduit and a second position where said first conduit communicates with said fourth conduit and is cut off from said second conduit; second valve means interconnecting said third conduit with said second and fourth conduits and having a first position where said third conduit is cut off from said second and fourth conduits, a second position where said third conduit communicates with said second conduit and is cut off from said fourth conduit, and a third position where said second conduit communicates with said fourth conduit and said third conduit is cut off from said second and fourth conduits; a hydraulic servomotor adapted to be connected to a fuel supply valve for regulating the latter to control the rate of fuel supply to the power plant and being connected to said first conduit to receive fluid therefrom; pressure-sensitive operating means connected to said first valve means for placing the same in said first position when said operating means senses a pressure corresponding to a temperature below a predetermined value and for placing said first valve means in said second position when temperature is above a predetermined value; and control means operatively connected to said second valve means for maintaining the latter in said first position when there is a predetermined ratio between the total and static pressures of the atmosphere, for placing said second valve means in said second position thereof when said static pressure increases or said total pressure decreases to disturb said ratio, and for placing said second valve means in said third position when said total pressure increases or said static pressure decreases to disturb said ratio.

References Cited in the file of this patent

UNITED STATES PATENTS

| | | |
|---|---|---|
| 1,874,704 | Johnson | Aug. 30, 1932 |
| 2,071,986 | Quave | Feb. 23, 1937 |
| 2,489,586 | Ray | Nov. 29, 1949 |
| 2,497,431 | Beman | Feb. 14, 1950 |
| 2,512,790 | Cleveland | June 27, 1950 |
| 2,564,127 | Orr | Aug. 14, 1951 |
| 2,638,739 | Barr | May 19, 1953 |
| 2,642,237 | Page et al. | June 16, 1953 |